US010866784B2

(12) United States Patent
Zielinski et al.

(10) Patent No.: US 10,866,784 B2
(45) Date of Patent: Dec. 15, 2020

(54) AUDIOVISUAL DEVICES

(71) Applicant: Mattel, Inc., El Segundo, CA (US)

(72) Inventors: James P. Zielinski, Lawndale, CA (US); E. Ernst Ginkel, La Verne, CA (US)

(73) Assignee: Mattel, Inc., El Segundo, CA (US)

( * ) Notice: Subject to any disclaimer, the term of this patent is extended or adjusted under 35 U.S.C. 154(b) by 253 days.

(21) Appl. No.: 15/839,411

(22) Filed: Dec. 12, 2017

(65) Prior Publication Data

US 2019/0179609 A1    Jun. 13, 2019

(51) Int. Cl.
| | |
|---|---|
| *A63H 33/26* | (2006.01) |
| *A63H 13/00* | (2006.01) |
| *A61H 11/00* | (2006.01) |
| *G06F 3/16* | (2006.01) |
| *H04R 1/02* | (2006.01) |
| *A63H 5/00* | (2006.01) |
| *A63H 29/22* | (2006.01) |
| *H04R 3/00* | (2006.01) |
| *A63H 33/22* | (2006.01) |
| *A63H 11/00* | (2006.01) |

(52) U.S. Cl.
CPC .............. *G06F 3/167* (2013.01); *A63H 5/00* (2013.01); *A63H 11/00* (2013.01); *A63H 13/00* (2013.01); *A63H 29/22* (2013.01); *A63H 33/22* (2013.01); *A63H 33/26* (2013.01); *H04R 1/028* (2013.01); *H04R 3/00* (2013.01)

(58) Field of Classification Search
CPC ........ A63H 13/00; A63H 29/22; A63H 33/26; A63H 11/00
See application file for complete search history.

(56) References Cited

U.S. PATENT DOCUMENTS

| | | |
|---|---|---|
| 4,027,425 A | 6/1977 | Morrison et al. |
| 4,139,968 A | 2/1979 | Milner |
| 4,717,364 A * | 1/1988 | Furukawa .............. A63H 11/00 367/198 |

(Continued)

FOREIGN PATENT DOCUMENTS

| | | |
|---|---|---|
| EP | 0228895 | 7/1987 |
| EP | 1033159 | 9/2000 |

(Continued)

*Primary Examiner* — Eugene L Kim
*Assistant Examiner* — Alyssa M Hylinski
(74) *Attorney, Agent, or Firm* — Edell, Shapiro & Finnan, LLC

(57) ABSTRACT

Audiovisual devices and methods of controlling those devices are disclosed. In some embodiments, an audiovisual toy may include a controller configured to receive a first output signal generated by an audio input device based on received first audio input that exceeds a predetermined threshold level, ignore the audio input device subsequent to receiving the first output signal during a first predetermined time interval, drive a motor based on the received first output signal during the first predetermined time interval, and, after the first predetermined time interval has elapsed, wind down the motor during a second predetermined time interval and monitor, during the second predetermined time interval, for a second output signal generated by the audio input device based on received second audio input that exceeds the predetermined threshold level.

20 Claims, 7 Drawing Sheets

(56) References Cited

U.S. PATENT DOCUMENTS

| | | | |
|---|---|---|---|
| 4,775,351 A | 10/1988 | Provenzano, Jr. | |
| 4,795,395 A | 1/1989 | Oishi et al. | |
| 4,850,930 A | 7/1989 | Sato et al. | |
| 4,889,027 A * | 12/1989 | Yokoi | A63H 33/006 13/4 |
| 4,913,676 A | 4/1990 | Koguchi et al. | |
| 4,923,428 A | 5/1990 | Curran | |
| 4,944,708 A | 7/1990 | Kawabe | |
| 4,983,890 A | 1/1991 | Satoh et al. | |
| 5,040,319 A | 8/1991 | Wang et al. | |
| 5,056,249 A | 10/1991 | Sakurai | |
| 5,090,936 A * | 2/1992 | Satoh | A41G 1/002 40/411 |
| 5,108,341 A | 4/1992 | DeSmet | |
| 5,176,560 A | 1/1993 | Wetherell et al. | |
| 5,209,695 A | 5/1993 | Rothschild | |
| 5,303,491 A | 4/1994 | Satoh et al. | |
| 5,402,702 A | 4/1995 | Hata | |
| 5,587,545 A | 12/1996 | Nakada et al. | |
| 5,911,617 A | 6/1999 | Chou | |
| 5,941,756 A | 8/1999 | Chou | |
| 5,951,360 A * | 9/1999 | Fearon | A63H 33/006 446/227 |
| 6,163,992 A | 12/2000 | Chou | |
| 6,200,191 B1 | 3/2001 | Chou | |
| 6,238,262 B1 | 5/2001 | Pracas | |
| 6,500,043 B1 | 12/2002 | Fong | |
| 6,579,143 B1 | 6/2003 | Rehkemper et al. | |
| 7,183,929 B1 * | 2/2007 | Antebi | A63H 30/04 340/384.1 |
| 7,528,313 B2 | 5/2009 | Saijo | |
| 7,667,122 B2 | 2/2010 | Saijo | |
| 7,731,560 B2 | 6/2010 | Kratz | |
| 7,867,055 B2 | 1/2011 | Todokoro | |
| 8,210,894 B2 * | 7/2012 | Chan | A63H 11/00 446/175 |
| 8,378,196 B2 | 2/2013 | Lund et al. | |
| 2004/0209544 A1 * | 10/2004 | Chan | A63H 33/22 446/268 |
| 2006/0094326 A1 | 5/2006 | Chen | |
| 2007/0037475 A1 * | 2/2007 | Spear | A63H 13/00 446/330 |
| 2008/0020670 A1 | 1/2008 | Kratz | |
| 2010/0131078 A1 | 5/2010 | Brown et al. | |
| 2010/0225263 A1 * | 9/2010 | Mishima | H02P 1/18 318/430 |
| 2011/0034103 A1 * | 2/2011 | Fong | A63H 3/28 446/297 |
| 2014/0249673 A1 | 9/2014 | Lin | |
| 2018/0008902 A1 * | 1/2018 | Fung | A63H 33/26 |

FOREIGN PATENT DOCUMENTS

| | | |
|---|---|---|
| GB | 2186204 | 8/1987 |
| GB | 2229646 | 7/1990 |
| GB | 2268845 | 1/1994 |
| GE | 2818987 | 11/1978 |

* cited by examiner

AUDIOVISUAL DEVICES

BACKGROUND

People of all ages enjoy dancing to music as well as watching others dance. Various devices are available which move in response to and/or in synch with the beat of music detected either through a microphone or through an audio input signal. Such "dancing" devices may be controlled in various ways. For example, the movement of an audiovisual device may be controlled by a button or crank on the device, a remote control, and/or other external stimuli, such as music. In examples where the device is controlled by external stimuli, such as music, the sound may be picked up by a microphone and translated into an electrical signal which is then used to control one or more motors.

SUMMARY

In some embodiments, a toy may include a housing having a base portion and at least one movable portion. The at least one movable portion of the housing may be configured to move among a plurality of positions relative to the base portion. The toy may additionally include a motor contained within the housing and configured to move the at least one movable portion of the housing among the plurality of positions. The toy may further include an audio input device configured to receive audio input and to generate an output signal based on the received audio input.

The toy may additionally include a controller. The controller may be configured to receive a first output signal generated by the audio input device based on received first audio input that exceeds a predetermined threshold level. The controller may additionally be configured to ignore the audio input device subsequent to receiving the first output signal during a first predetermined time interval, and drive the motor based on the received first output signal during the first predetermined time interval. After the first predetermined time interval has elapsed, the controller may further be configured to wind down the motor during a second predetermined time interval and to monitor, during the second predetermined time interval, for a second output signal generated by the audio input device based on received second audio input that exceeds the predetermined threshold level.

In some embodiments, a method of controlling a toy having a controller, an audio input device, and a motor may include receiving, by the controller, a first output signal generated by the audio input device based on a first audio input that exceeds a predetermined threshold level. The method may additionally include ignoring, by the controller, the audio input device subsequent to receiving the first output signal during a first predetermined time interval. The method may further include driving, by the controller, the motor based on the received first output signal during the first predetermined time interval. After the first predetermined time interval has elapsed, the method may additionally include winding down, by the controller, the motor during a second predetermined time interval and monitoring, by the controller and during the second predetermined time interval, for a second output signal generated by the audio input device based on second audio input that exceeds the predetermined threshold level.

Features, functions, and advantages may be achieved independently in various embodiments of the present disclosure, or may be combined in yet other embodiments, further details of which can be seen with reference to the following description and drawings.

DESCRIPTION

Figure 1:
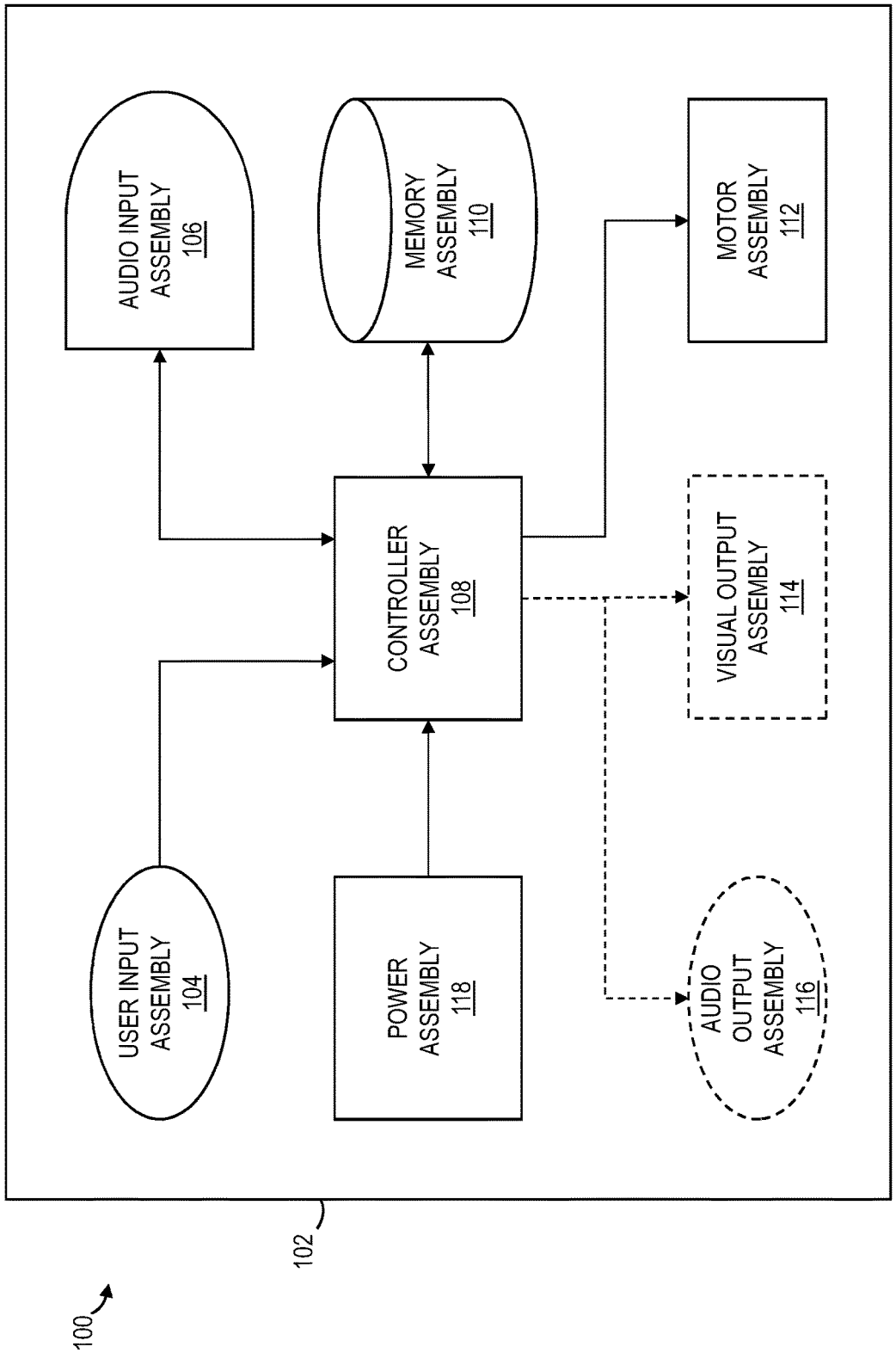
FIG. 1 is a block diagram of an example of an audiovisual device.

Various embodiments of an audiovisual device are described below and illustrated in the associated drawings. Unless otherwise specified, the audiovisual device and/or its various components may contain at least one of the structures, components, functionalities, and/or variations described, illustrated, and/or incorporated herein. Furthermore, the structures, components, functionalities, and/or variations described, illustrated, and/or incorporated herein in connection with the present teachings may be included in other similar audiovisual devices. The following description of various embodiments is merely illustrative in nature and is in no way intended to limit the disclosure, its application, or uses. Additionally, the advantages provided by the embodiments, as described below, are illustrative in nature and not all embodiments provide the same advantages or the same degree of advantages.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

"Audibly shield" means to absorb, isolate, reduce, or minimize the noises or sounds generated by a first device (e.g., motor) such that those noises or sounds are not received (or less of those sounds are received) by a second device (e.g., microphone), and/or to isolate or protect the second device such that the noises or sounds from the first device are not received (or less of those sounds are received) by the second device.

Terms such as "first", "second", and "third" are used to distinguish or identify various members of a group, or the like, and are not intended to show serial or numerical limitation.

Overview

In general, an audiovisual device may comprise a controller assembly in communication with a memory assembly, wherein the controller assembly controls a motor assembly, a visual output assembly, and/or an audio output assembly. The controller assembly may receive inputs from an audio input assembly and/or a user input assembly. The various components of an audiovisual device may be contained within a housing. The housing may take any of a variety of suitable shapes or forms. For example, the housing may have a whimsical or fanciful shape, pattern, and/or color. A portion of the housing may be configured to move in response to the movement of the motor assembly. In some examples, the housing may have a base portion and at least one movable portion, wherein the at least one movable portion of the housing is configured to move among a plurality of positions relative to the base portion. In some examples, the motor may be configured to move the at least one movable portion of the housing among the plurality of positions and the audio input device may be configured to receive audio input and to generate an output signal based on the received audio input.

According to aspects of the present disclosure, the controller assembly may be configured to receive a first output signal from the audio input assembly, ignore the audio input device subsequent to the received first output signal during a first predetermined time interval, drive the motor based on the received first output signal during the first predetermined time interval, and after the first predetermined time interval has elapsed, wind down the motor during a second predetermined time interval and monitor, during the second predetermined time interval, for a second output signal from the audio input device. The audio input assembly may produce an output signal, such as the first and second output signals, for each audio input received by the audio input assembly or only when the received audio input exceeds a predetermined threshold, such as a threshold decibel level.

Examples, Components, and Alternatives

The following sections describe selected aspects of illustrative audiovisual devices as well as related apparatuses and/or methods. The examples in these sections are intended for illustration and should not be interpreted as limiting the entire scope of the present disclosure. Each section may include one or more distinct inventions, and/or contextual or related information, function, and/or structure.

Illustrative Audiovisual Device:

This example describes an audiovisual device; see FIG. 1.

FIG. 1 is a block diagram of an audiovisual device, generally indicated at 100. Audiovisual device may be in any suitable form, such as an audiovisual toy, a portable or desktop device, a mechanical sculpture, etc. Various components of device 100 are contained within a housing 102. Housing 102 may include any suitable exterior container. In some examples, housing 102 may include flexible translucent plastic. In some examples, housing 102 may include a base portion and at least one movable portion that is configured to move among a plurality of positions relative to the base portion. Movement may include rotation (about one or more axes), pivoting, and/or sliding relative to the base portion. Housing 102 may contain or at least partially contain one or more other components of device 100.

Audiovisual device 100 may additionally include a user input assembly 104. User input assembly 104 may include any suitable components configured to receive input from a user, such as user input to power on and/or to power off, to increase or decrease volume of an audio output assembly, to increase or decrease brightness of a visual output assembly, etc. In some examples, user input assembly 104 may include one or more buttons, levers, or switches.

Audiovisual device 100 may further include an audio input device or audio input assembly 106, which may include any suitable components configured to detect sounds, such as sounds produced by one or more external sources. In some examples, audio input assembly 106 may include one or more microphones. Additionally, the audio input assembly may include a mounting or holder for the microphone(s) that is configured to audibly shield those microphones from the motor assembly. The audio input assembly may be configured to receive audio input and to generate an output signal based on the received audio input. In some examples, the audio input assembly may filter the received audio input to isolate one or more musical beats. In those examples, the audio input assembly may include at least one filter (e.g., low pass filter) to isolate, for example, the bass drum and/or kick drum from the audio input. In some examples, audio input assembly 106 may generate output signals for all audio input detected or received, such as an output signal for each audio input received. In other examples, the audio input assembly may be configured to generate an output signal only when a valid audio input (or valid sound input) is received, such as when the received audio input is above and/or below predetermined threshold levels (e.g., predetermined decibel levels), or is within or outside a predetermined range.

In some examples, the audio input device may be configured to generate an output signal based on received audio input only when that received audio input is a musical rhythmic beat. In other words, the audio input assembly must detect a beat of a musical work before an output signal is generated. Audio input that is a musical rhythmic beat may sometimes be referred to in the present application as "audio input that exceeds a predetermined threshold level," where the threshold level are the characteristics of the audio input that must be exceeded to have a musical rhythmic beat. The audio input assembly may generate the same output signals or different output signals based on whether the audio input is above and/or below predetermined threshold levels (or is within or outside a predetermined range). The predetermined threshold levels may be the same or may be different based on the particular time interval. For example, the initial predetermined threshold level may be lower or higher than subsequent predetermined threshold levels (such as during subsequent predetermined time intervals). In some examples, the audio input assembly may be configured to perform automatic gain control to provide output signals with a controlled signal amplitude despite variations of the amplitude of the input signals. In some examples, the audio output assembly may alternatively, or additionally, be configured to generate an output signal based on received audio input when that received audio input does not include a musical beat or musical rhythmic beat, such as people talking, animal sounds, machine sounds, etc.

In some examples, the audio input assembly may be operable between an "on" or activated state in which the audio input assembly receives audio input, generates output signal(s) based on the received audio input, and/or sends those signals to the controller assembly, and an "off" or deactivated state in which the audio input assembly does not receive audio input, does not generate output signal(s) based on the received audio input, and/or does not send those signals to the controller assembly. In some examples, audio input assembly 106 may include one or more visual input devices, such as a camera or a sensor. In those examples, audio input assembly may be referred to as an "audiovisual input assembly."

Audiovisual device 100 may additionally include a controller assembly 108. Controller assembly 108 may include any suitable components configured to (1) monitor, receive, and/or process one or more inputs, signals, data, and/or information from user input assembly 104 and/or audio input assembly 106; (2) read and/or retrieve information or data from memory, such as the memory assembly discussed below; and (3) control one or more assemblies of the audiovisual device based on (1) and/or (2), such as a motor assembly, a visual output assembly, and/or an audio output assembly, as further discussed below. In some examples, controller assembly 108 may include one or more processors or controllers and/or a data processing system. In some examples, the audio input assembly may provide output signals for all received audio inputs and the controller assembly may determine whether the received audio inputs are above and/or below predetermined threshold levels (or are within or outside a predetermined range) and control other assemblies based on the above determination. For example, the controller assembly may determine when the received audio input is a beat of a musical work, and may control one or more other assemblies based on that determination.

The audiovisual device may further include a memory assembly 110, which may include any suitable components for storing data or information. Memory assembly 110 may include any suitable hardware capable of storing information (e.g., digital information), such as data, program code in functional form, and/or other suitable information, either on a temporary basis or a permanent basis. Storage devices also may be referred to as computer-readable storage devices or computer-readable media. Memory assembly 110 may include a volatile storage memory and a non-volatile memory. In some examples, a basic input/output system (BIOS), containing the basic routines to transfer information between elements within a data processing system, such as during start-up, may be stored in a non-volatile memory. Memory assembly 110 may include persistent storage. Persistent storage may take various forms, depending on the particular implementation. Persistent storage may contain one or more components or devices. For example, persistent storage may include one or more devices such as a magnetic disk drive (also referred to as a hard disk drive or HDD), solid state disk (SSD), floppy disk drive, tape drive, Jaz drive, Zip drive, LS-YY0 drive, flash memory card, memory stick, and/or the like, or any combination of these. One or more of these devices may be removable and/or portable, e.g., a removable hard drive. Persistent storage may include one or more storage media separately or in combination with other storage media, including an optical disk drive such as a compact disk ROM device (CD-ROM), CD recordable drive (CD-R Drive), CD rewritable drive (CD-RW Drive), and/or a digital versatile disk ROM drive (DVD-ROM).

Motor assembly 112 may include any suitable motor(s) configured to move in a plurality of directions. For example, motor assembly 112 may include one or more reversible motors that are configured to rotate in either of at least two directions (e.g., clockwise and counterclockwise) and, in doing so, rotate one or more movable portions of the housing of the device in either of at least two directions. The motor(s) of the motor assembly also may be configured to move and/or rotate in different speeds. The motor assembly may include one or more rubberized mounts to reduce motor vibration during operation. Motor assembly 112 also may include one or more gear assemblies configured to operatively connect the motor(s) to the moveable portion(s) of the housing such that the motor(s) may move one or more of the moveable portions of the housing among a plurality of positions relative to the base portion. For example, the gear assembly may receive rotational movement from the motor and convert that movement to rotating, pivoting, and/or sliding movement of the moveable portion(s) relative to the base portion.

In some examples, device 100 may include a visual output assembly 114, which may include any suitable components configured to provide one or more visual outputs. For example, visual output assembly 114 may include one or more light emitting diodes (LEDs) and associated LED drivers. The LEDs may be spaced or positioned along any suitable portions of the device and adjacent to translucent portions of the housing. The LEDs may provide one color and/or multiple colors when activated. Controller assembly 108 may independently light up one or more LEDs of the device in one or more colors based on inputs received from the audio input assembly and/or the user input assembly.

In some examples, the audiovisual device may include an audio output assembly 116, which may include any suitable components configured to generate audio outputs in accordance with instructions from controller assembly 108. For example, audio output assembly 116 may include one or more speakers. Controller assembly 108 may generate one or more audio outputs via the speaker(s) based on inputs received from the audio input assembly and/or the user input assembly.

Audiovisual device 100 may additionally include a power assembly 118, which may include any suitable components configured to provide power to one or more other components of the device, such as audio input assembly 106, controller assembly 108, motor assembly 112, visual output assembly 114, and/or audio output assembly 116. For example, power assembly 118 may include a power cord receptacle configured to receive a connector from a power adapter that plugs into an electrical outlet, a connector that connects to a computer, laptop, tablet, or smart phone, or a connector that connects to other power sources, such as one or more solar cells and/or fuel cells. Power assembly 118 may alternatively, or additionally, include a battery assembly configured to receive one or more batteries of any suitable type(s) and/or size(s).

In some examples, the controller assembly may control one or more other assemblies, such as the motor assembly, visual output assembly, and/or audio output assemblies based on a look-up table saved in the memory assembly. The look-up table may include scripted motions that control, for example, the motor assembly based on determinations made regarding the output signal from the audio input assembly. In some examples, the scripted motions may be modified and/or randomized such that a first output signal that is generated from a first audio input results in a first motion sequence, while a second output signal that is generated from a second audio input results in a second motion sequence. In some examples, when the second audio input is similar or only slightly different from the first audio input, the controller assembly configures the second output signal to be different in time, speed, and/or envelope shape than the first output signal to produce movements via the motor assembly that appear to be more human and less mechanical.

Figure 2:
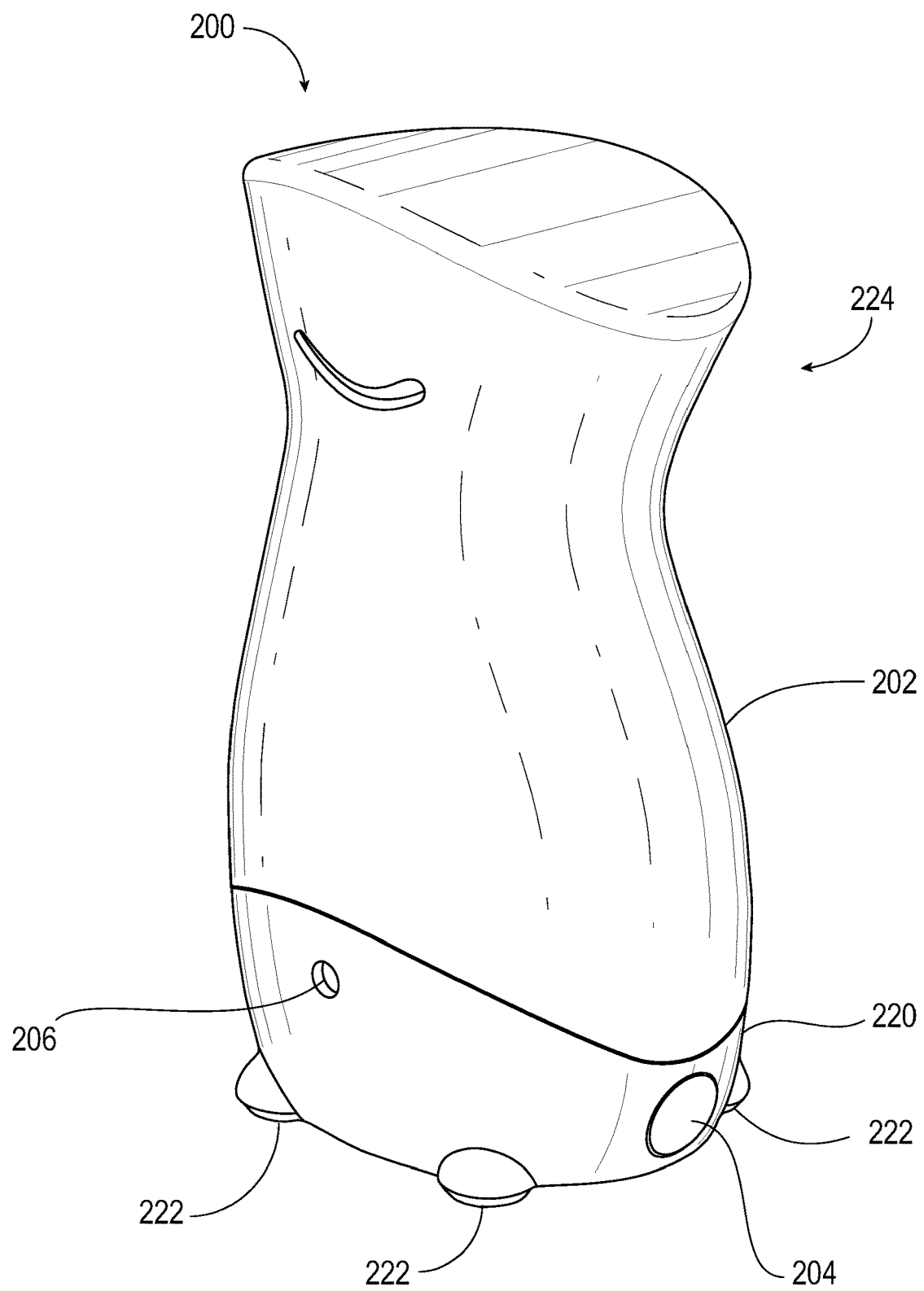
FIG. 2 is a side perspective view of an example of the device of FIG. 1 in the form of an audiovisual toy.
Figure 3:
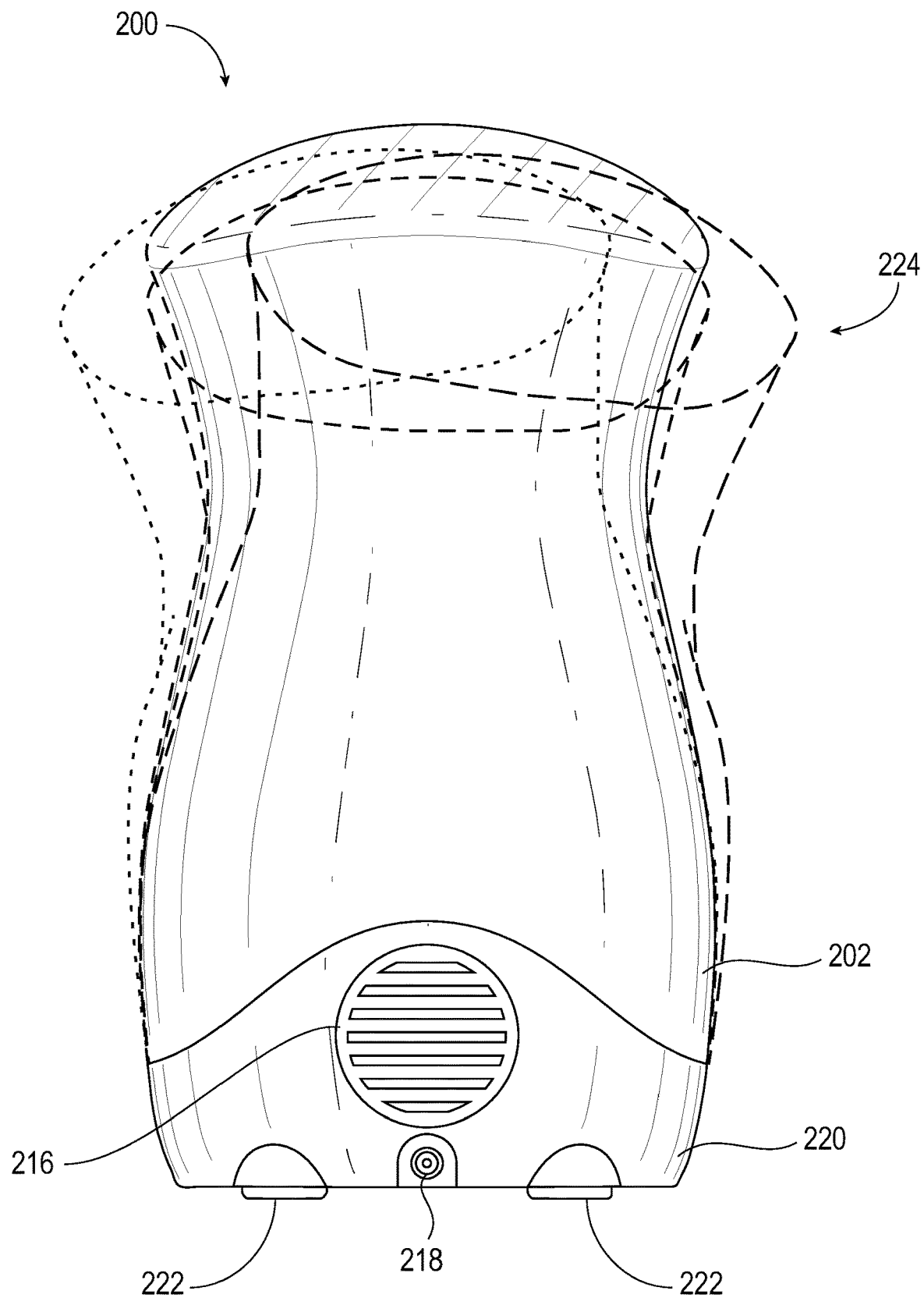
FIG. 3 is a rear view of the toy of FIG. 2, showing illustrative movements of a moveable portion relative to a base portion.
Figure 4:
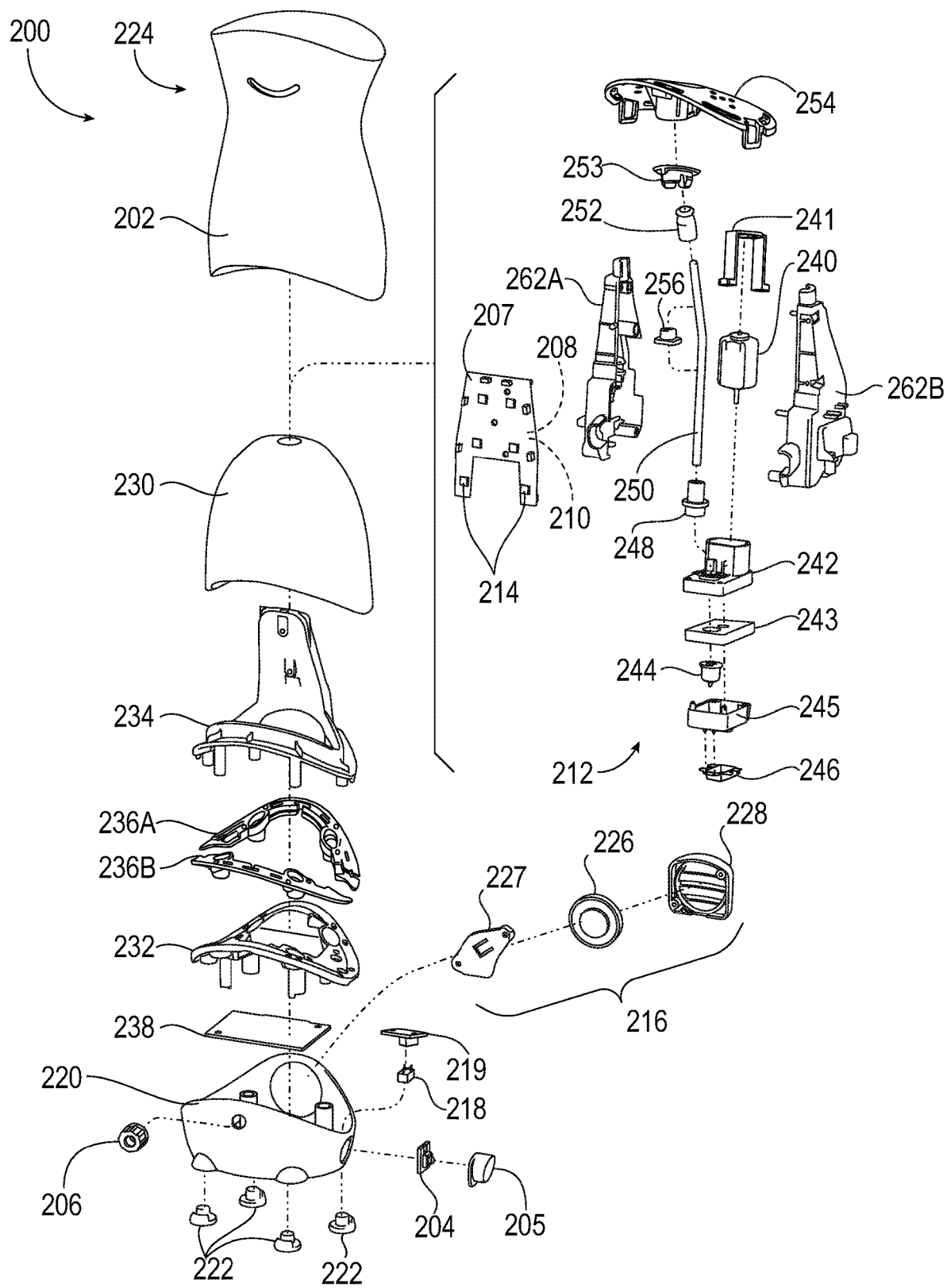
FIG. 4 is an exploded view of the toy of FIG. 2.

Embodiment of an Audiovisual Toy:

This example describes an embodiment of an audiovisual toy; see FIGS. 2-4.

FIGS. 2-4 are various views of an embodiment of an audiovisual toy, generally indicated at 200. Audiovisual toy 200 is an example of device 100 described above. Unless explicitly stated, audiovisual toy 200 may include one or more components of other audiovisual devices of the present disclosure, including audiovisual device 100.

Audiovisual toy 200 may have a housing 202. Housing 202 may be any suitable shape(s) and may be made of any suitable material configured to allow one or more portions of the housing to move in response to movement of motor(s). Housing 202 may include multiple portions each having distinct features, purposes, and/or materials. At least some portion(s) of housing 202 may include any suitable material(s) configured to be able to bend, flex, and/or move repeatedly without showing significant wear. In some examples, at least some portion(s) of housing 202 may include a flexible, translucent plastic or rubber material.

Housing 202 includes a base 220 and at least one moveable portion 224, which may be configured to move among a plurality of positions relative to base 220, as shown in FIG. 3. Base 220 may include any suitable structure configured to support one or more other components of audiovisual toy 200. In some examples, base 220 may include any suitable material(s) configured to provide a rigid support structure, such as a hard and/or rigid plastic. In FIGS. 2-4, base 220 includes four supports 222. Supports 222 may be formed as one piece with base 220 or may include separate pieces attached to base 220. In some examples, audiovisual toy 200 may include more or fewer than four supports. In some examples, base 220 and supports 222 may include hard plastic. In some examples, supports 222 may include rubber pieces configured to prevent toy 200 from sliding on a support surface.

As seen in FIG. 2, base 220 includes a power button 204. Power button 204 may include any suitable structure configured to transition audiovisual toy 200 between a powered-on state and a powered-off state. In the example shown in FIG. 4, power button 204 is protected by a power button casing 205. Power button casing 205 may include any suitable structure to protect power button 204 while still allowing a user to interface with power button 204. Base 220 also includes a microphone assembly 206 configured to receive audio input and/or to generate and/or send output signals to the controller based on the received audio input, such as when the received audio input exceeds a predetermined threshold level or is within a predetermined threshold range. The microphone assembly includes at least one microphone mounted on a microphone holder. The microphone holder may be configured to audibly shield the microphone from the motor assembly. For example, the microphone holder may include a plurality of dimples or ribs on an interior wall of the holder to contact and hold the microphone in the center of the holder. Securing the microphone via the dimples or ribs may minimize contact of the microphone with other components of the audiovisual toy, which may dampen vibrations from other components that may otherwise be picked up or received by the microphone as audio input.

As seen in FIG. 3, base 220 includes a speaker assembly 216, which may include any suitable structure configured to generate audio output based on instructions from the controller assembly. In the example shown in FIG. 4, speaker assembly 216 includes a speaker 226, a speaker support structure 227, and a speaker cover 228. Base 220 also includes a power port 218, which may include any suitable structure configured to receive a connector that is connectable to one or more power sources. In the example shown in FIG. 4, power port 218 is held in place by a power port support structure 219.

Toy 200 also includes an internal shell 230, which may include any suitable structure configured to contain one or more other components, such as a motor assembly and a controller. Internal shell 230 is supported by a first support structure 232 and a second support structure 234. Second support structure 234 may include any suitable structure to couple to and support the shape of internal shell 230. A third support structure having a first component 236A and a second component 236B couples housing 202 to first support structure 232, which in turn couples to base 220 via a support plate 238. Second support structure 234 also couples to third support structure 236 and thus to base 220 via first support structure 232 and support plate 238.

Audiovisual toy 200 additionally includes a motor assembly 212, which may include any suitable structure configured to move moveable portion(s) 224 among a plurality of positions. In this example, motor assembly 212 includes a motor 240, which attaches to an upper gear box 242. Motor 240 is held in place by motor attachment strap 241. Upper gear box 242 attaches to a lower gear box 243, which in turn attaches to a head gear 244 and a gear box connector 245. Gear box connector 245 couples to a gear box base 246.

Motor assembly 212 further includes a rod 250, which couples to upper gear box 242 via a first rod support 248. Rod 250 may include any suitable structure configured to translate movement of the motor to the moveable portion(s) of housing 202. In this example, rod 250 is bent such that, as it rotates, a first adapter 252 moves around in a circular path. First adapter 252 hingedly and rotatably attaches to a second adapter 253 which couples to a plate 254. Plate 254 is fixedly attached to an inside of movable portion(s) 224. Thus, as rod 250 rotates and first adapter 252 moves around in a circular path, movable portion(s) 224 moves with first adapter 252. Rod 250 may be supported by a second rod support 256. Second rod support 256 may include any suitable structure configured to maintain an alignment of the unbent portion of rod 250. In this example, second rod support 256 is located just below the bent portion of rod 250 and spaced apart from first rod support 248.

Motor assembly 212 is substantially located within a motor support assembly 262, which comprises a first half 262A and a second half 262B. Motor support assembly 262 may be configured to support and substantially enclose motor assembly 212, first and second rod supports 248 and 256, and the unbent portion of rod 250. In some examples, motor support assembly may be configured to audibly shield the motor assembly from the microphone and/or other components (e.g., housing) that may conduct or otherwise transfer vibrations to the microphone. For example, the motor support assembly may include one or more rubber pads to dampen vibration of the motor assembly. Motor support assembly 262 also may serve as a support structure for the circuit board discussed below.

Audiovisual toy 200 additionally includes a circuit board 207 having a controller 208 and/or memory 210. Controller 208 receives inputs from the microphone and controls motor 240 based on the inputs. For example, controller 208 may be configured to receive output signals from microphone 206 based on received audio inputs that exceed a predetermined threshold level, ignore microphone 206 (e.g., ignore all output signals from the microphone), drive motor 240 of motor assembly 212 based on the received output signals, wind down motor 240, and/or monitor for additional output signals based on received audio inputs that exceed the predetermined threshold level. The controller may perform any combination of the above in any sequence and during any time intervals (such as predetermined time intervals, which may be the same or different from each other). For example, controller 208 may be configured to perform one or more steps recited in the methods described below.

Circuit board 207 may further include a plurality of light emitting diodes (LEDs) 214. In some examples, controller 208 may be configured to control one or more LEDs of the plurality of LEDs 214 and/or speaker assembly 216 in response to audio inputs and/or output signals from microphone 206. In some examples, controller 208 may be configured to illuminate one or more LEDs in response to one or more output signals from the audio input device, such as in response to at least one of the received first or second output signals. In some examples, control of LEDs 214 and of speaker 216 may be coordinated with control of motor 240. In this way, the movement of audiovisual toy 200 may be accompanied by coordinated lights and sounds.

In some examples, audiovisual toy 200 may respond to music. In some examples, music may be played external to audiovisual toy 200 and microphone 206 may be configured to detect the beats in that music. These beats may be communicated to controller 208 which may run motor 240, LEDs 214, and/or speaker assembly 216 in a coordinated response to the music that may mimic dancing.

In some examples, audiovisual toy 200 may execute stored routines. In some examples, microphone 206 may be configured to detect audible commands from a user or from another electronic device, such as a virtual assistant and/or a software agent. These commands may be communicated to controller 208 and may correspond to stored routines or reactions stored in memory 210. Controller 208 may run motor 240, LEDs 214, and/or speaker assembly 216 in a coordinated routine or response in accordance with the command and information stored in memory 210. Although audiovisual toy 200 is shown in the form of a desktop toy, the audiovisual toy may alternatively be in the form of other toys, such as a doll, a toy vehicle, a toy figure, etc., or in the form of other audiovisual devices, such as a portable or desktop device or a mechanical sculpture.

Illustrative Method of Control:

This section describes steps of an illustrative method for a device or toy having a controller, an audio input device, and a motor, which is general indicated at 500. Controller assembly 108 and/or controller 208 of device 100 and toy 200, respectively, may execute one or more steps of method 500; see FIG. 5. Aspects of audiovisual devices (for example, device 100 and toy 200) and control systems (for example, controller assembly 108 and controller 208) for audiovisual devices and toys as described above may be utilized in the method steps described below.

Figure 5:
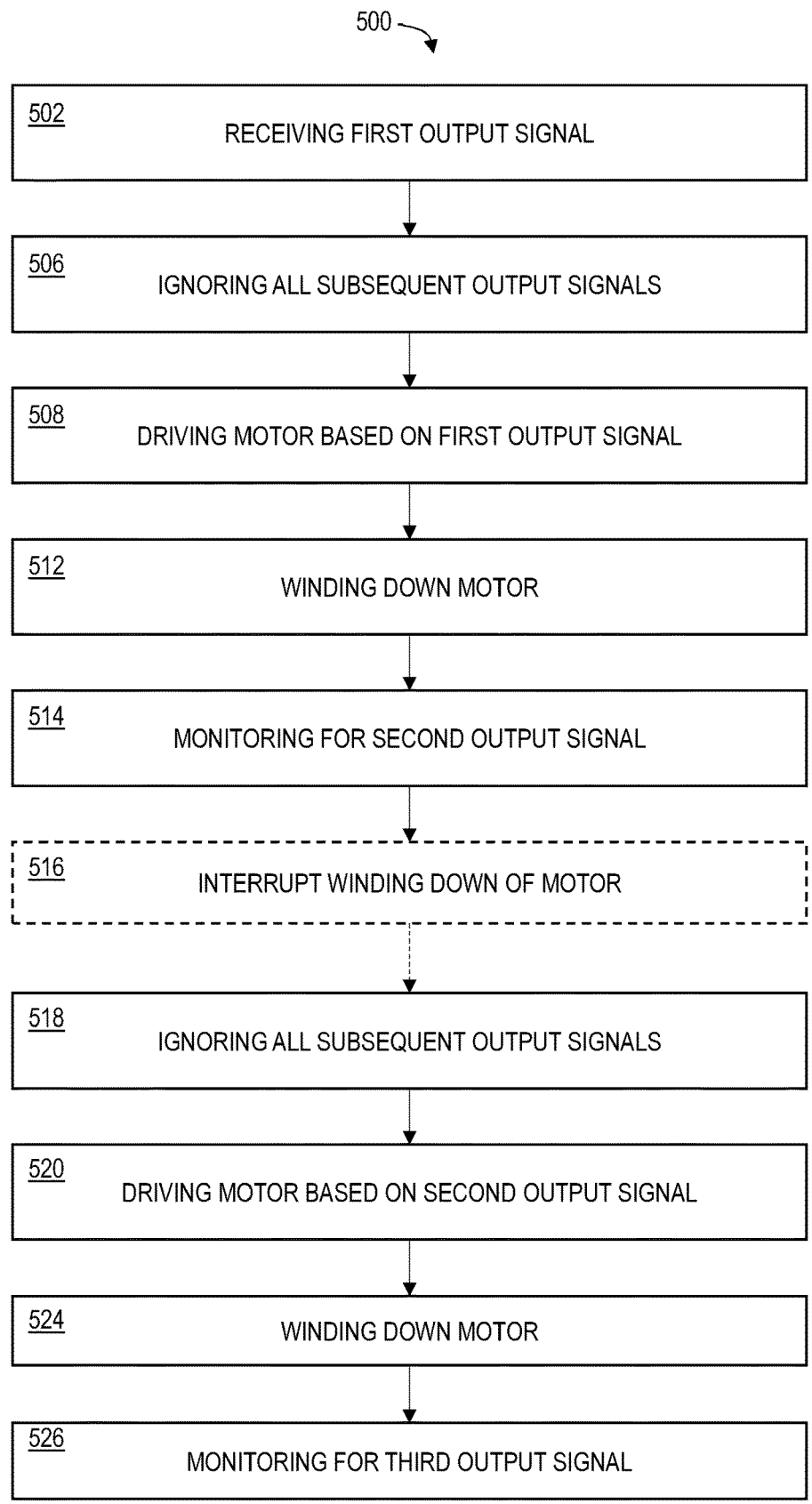
FIG. 5 is a flowchart depicting steps of an illustrative method of controlling a toy.

FIG. 5 is a flowchart illustrating steps performed in an illustrative method, and may not recite the complete process or all steps of the method. Although various steps of method 500 are described below and depicted in FIG. 5, the steps need not necessarily all be performed, and in some cases may be performed simultaneously or in a different order than the order shown. In other words, different embodiments of method 500 may include any combination of all and/or less than all of the steps shown in FIG. 5.

At step 502, a first output signal is received from an audio input assembly. In some examples, the first output signal must be based on first audio input that exceeds a first predetermined threshold level to be recognized by the controller. For example, the first audio input must be a beat of a musical work before that audio input is recognized by the controller. In other examples, the first audio input must exceed a first predetermined threshold level (e.g., must be a beat of a musical work) for the audio input assembly to generate the first output signal.

At step 506, all output signals from the audio input device are ignored, disregarded, or masked out. In some examples, step 506 may include receiving but not acting on output signals from the audio input assembly. In other examples, step 506 may include placing the audio input assembly in a deactivated state in which the audio input device does not receive audio input and/or does not generate an output signal (such as when the received audio input exceeds a predetermined threshold level). In some examples, the port of the controller that receives the output signals from the audio input device is kept "busy" or "busied" to prevent those signals from being processed by the controller. Step 506 may be performed during any suitable time interval, such as a first predetermined time interval (e.g., approximately 350 milliseconds). In some examples, the audio input assembly may be operated in an activated state after the first predetermined time interval has elapsed.

At step 508, the motor is driven based on the received first output signal. The motor may be driven in a first direction and/or at a first speed based on the first output signal. The first direction may be any suitable direction, such as clockwise or counterclockwise. Additionally, the first speed may be a constant speed or a changing speed (e.g., increasing and/or decreasing speed).

Figure 6:
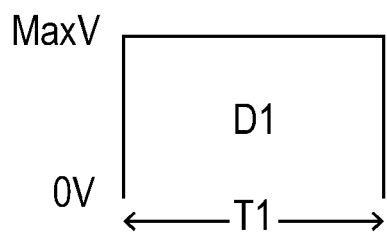
FIG. 6 is an example of a pulse-width-modulated signal having a rectangular envelope that may be used in the toy of FIG. 2 or in the method of FIG. 5.

In some examples, driving the motor assembly in the first direction at the first speed based on the first output signal may include sending a pulse-width-modulated signal with a rectangular envelope to the motor assembly. The pulse-width-modulated signal with a rectangular envelope may sometimes be referred to as a "square wave signal" or a "square pulse." In some examples, the square wave may resemble a step function as shown in FIG. 6 in that the signal sent to the motor assembly may "jump" directly from zero voltage (0V) to a maximum voltage (MaxV), may continue at MaxV for substantially the entire duration of a time interval T1 to drive motor in a first direction D1, and may "jump" directly from MaxV to 0V. Although the signal is shown to be at the maximum voltage, other examples may include signals that are less than the maximum voltage. Additionally, although a square wave signal is shown, any suitably shaped signals may be used, such as a multi-step function signal, triangular signal, etc. Step 508 may be performed during any suitable time interval, such as the first predetermined time interval. In some examples, step 508 may be performed immediately after step 506 for the remainder of the first predetermined time interval. In other examples, steps 506 and 508 may be performed simultaneously.

At step 512, winding down of the motor is performed. In some examples, step 512 may be performed immediately after the first predetermined time interval elapses or at any suitable time. For example, the motor may be driven in the first direction at a second speed according to any suitable pattern. In some examples, the second speed decreases from an initial speed that is the same (or about the same) as the first speed to a final speed that is less than the first speed. In other examples, the second speed may decrease from an initial speed that is less than the first speed to a final speed that is substantially less than the initial speed. Step 512 may be performed during any suitable time interval, such as a second predetermined time interval. When the motor is running in the first direction in step 508, performing step 512 to drive the motor in the (a) same direction may make movement of the moveable portion(s) appear smoother or (b) opposite or different direction may make movement of the moveable portion(s) more distinct. The duration of the second predetermined time interval may not be consistent during every iteration of method 500 and/or step 512. In some examples, a maximum duration of second predetermined time interval may be set at 1 second or any other suitable time interval.

Figure 7:
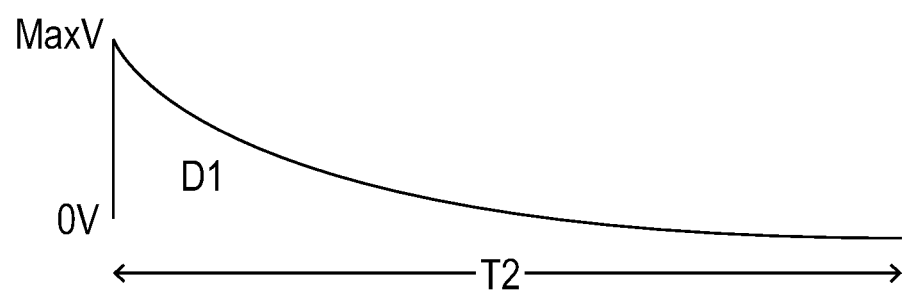
FIG. 7 is an example of a pulse-width-modulated signal having a logarithmic envelope that may be used in the toy of FIG. 2 or in the method of FIG. 5.

In some examples, winding down the motor assembly may include sending a pulse-width-modulated signal with a logarithmic fade envelope to the motor assembly. An illustrative example of a logarithmic fade envelope is shown in FIG. 7. D1 in FIG. 7 indicates that the motor is being driven in the first direction. In some examples, any suitable shape of envelope for a pulse-width-modulated signal may be used wherein the signal is configured to decrease in amplitude over time. The decrease in amplitude of the signal that the controller assembly sends to the motor assembly may correspond to the decrease in the second speed. Possible shapes of pulse-width-modulated signal may include, for example, a linear fade envelope, an exponential fade envelope, and/or a parabolic fade envelope. In some examples, the signal sent in step 512 may start at the same signal level as the signal sent in step 508 (i.e., also may start at MaxV). In some examples, the signal sent in step 512 may start at a different level than the signal sent in step 508. In some examples, the pulse-width-modulated signal with a suitable envelope may last for substantially the entire duration of the second predetermined time interval (T2 in FIG. 7). In other examples, the signal may last for less than the entire duration of the second predetermined time interval. Step 512 may be performed at any suitable time, such as immediately after the first predetermined time interval elapses.

At step 514, monitoring for a second output signal from the audio input assembly is performed, which may be performed after the first predetermined time interval elapses, during the second predetermined time interval, and/or after the second predetermined time interval elapses. While monitoring, the second output signal may be received at any time during the second predetermined time interval, at the end of the second predetermined time interval, or after the second predetermined time interval elapses. In some examples, second output signal must be based on second audio input that exceeds a second predetermined threshold level to be recognized by the controller. For example, the second audio input must be a beat of a musical work for the second audio input to be recognized by the controller. In other examples, the second audio input must exceed a second predetermined threshold for the audio input assembly to generate the second output signal. For example, the second audio input must be a beat of a musical work before the audio input assembly generates the second output signal. In some examples, the first predetermined threshold level and the second predetermined threshold level are the same level (e.g., same sensitivity level to a musical beat). In some examples, the first predetermined threshold level and the second predetermined threshold level may be different levels.

Although the second output signal may be received at any time as described above, monitoring for the second output signal from the audio input device may begin as soon as (or simultaneously as) the controller starts winding down the motor. In other words, audio inputs received by the audio input device are no longer ignored or disregarded as soon as the winding down of the motor begins. In some examples, step 514 may include placing the audio input assembly in an activated state in which the audio input device receives audio input and generates an output signal based on the received audio input (such as when the received audio input exceeds a predetermined threshold level). In other examples, the controller may be configured to monitor for the second output signal from the audio input device after (or shortly or immediately after) the winding down of the motor at step 512 has started.

When the second output signal is received during the second predetermined time interval, the winding down of the motor may be interrupted at step 516. In other words, the second predetermined time interval in which winding down of the motor occurs may end before the maximum duration of second predetermined time interval elapses (e.g., 1 second).

At step 518, all output signals from the audio input device are ignored or disregarded. In some examples, step 518 may include receiving but not acting on output signals from the audio input assembly. In other examples, step 518 may include placing the audio input assembly in a deactivated state in which the audio input device does not receive audio input and/or does not generate an output signal (such as when the received audio input exceeds a predetermined threshold level). In some examples, the port of the controller that receives the output signals from the audio input device is kept "busy" to prevent those signals from being processed by the controller. Step 506 may be performed during any suitable time interval, such as a third predetermined time interval (e.g., approximately 350 milliseconds), which may or may not be the same as the first predetermined time interval. In some examples, the audio input assembly may be operated in an activated state after third predetermined time interval has elapsed.

Figure 8:
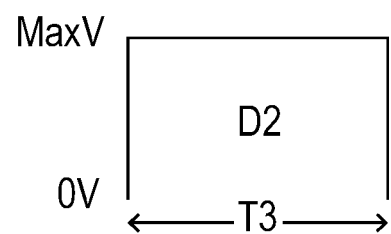
FIG. 8 is another example of a pulse-width-modulated signal having a rectangular envelope that may be used in the toy of FIG. 2 or in the method of FIG. 5.

At step 520, the motor is driven based on the received second output signal. The motor may be driven in a second direction and/or at a third speed based on the second output signal. The second direction may be different or the same as the first direction. The third speed may be different or the same as the first speed. In some examples, driving the motor assembly in the second direction at the third speed based on the second output signal may include sending a pulse-width-modulated signal with a rectangular envelope to the motor assembly. The pulse-width-modulated signal with a rectangular envelope may sometimes be referred to as a "square wave signal" or a "square pulse." In some examples, the square wave may resemble a step function as shown in FIG. 8 in that the signal sent to the motor assembly may "jump" directly from zero voltage (0V) to a maximum voltage (MaxV), may continue at MaxV for substantially the entire duration of a time interval T3 to drive motor in a second direction D2, and may "jump" directly from MaxV to 0V. Although the signal is shown to be at the maximum voltage, other examples may include signals that are less than the maximum voltage. Additionally, although a square wave signal is shown, any suitably shaped signals may be used, such as a multi-step function signal, triangular signal, etc.

Step 520 may be performed during any suitable time interval, such as the third predetermined time interval. In some examples, step 520 may be performed immediately after step 518 for the remainder of the third predetermined time interval. In other examples, steps 518 and 520 may be performed simultaneously.

At step 524, winding down of the motor is performed. In some examples, step 524 may be performed immediately after the third predetermined time interval elapses or at any suitable time. For example, the motor may be driven in the second direction at a fourth speed according to any suitable pattern. In some examples, the fourth speed decreases from an initial speed that is the same (or about the same) as the third speed to a final speed that is less than the third speed. In some examples, the fourth speed may decrease from an initial speed that is less than the third speed to a final speed that is substantially less than the initial speed. Step 524 may be performed during any suitable time interval, such as a fourth predetermined time interval. The duration of fourth predetermined time interval may not be consistent during every iteration of method 500 and/or step 512. In some examples, a maximum duration of fourth predetermined time interval may be set, which may be different or the same as the second predetermined time interval. In some examples, the maximum duration of the fourth predetermined time interval may be 1 second.

Figure 9:
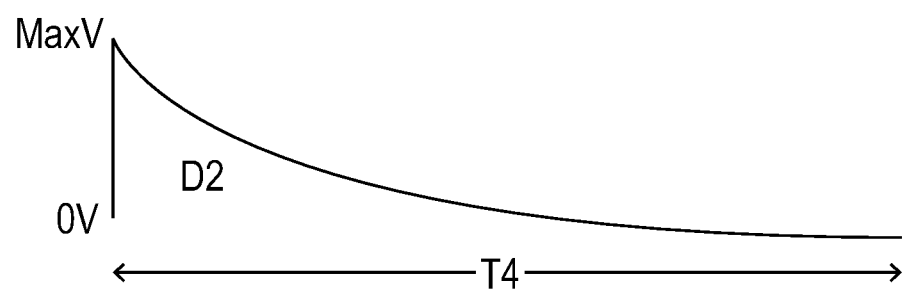
FIG. 9 is another example of a pulse-width-modulated signal having a logarithmic envelope that may be used in the toy of FIG. 2 or in the method of FIG. 5.

In some examples, winding down the motor assembly may include sending a pulse-width-modulated signal with a logarithmic fade envelope to the motor assembly. An illustrative example of a logarithmic fade envelope is shown in FIG. 9. D2 in FIG. 9 indicates that the motor is being driven in the second direction. In some examples, any suitable shape of envelope for a pulse-width-modulated signal may be used wherein the signal is configured to decrease in amplitude over time. The decrease in amplitude of the signal that the controller assembly sends to the motor assembly may correspond to the decrease in the fourth speed. Possible shapes of pulse-width-modulated signal may include, for example, a linear fade envelope, an exponential fade envelope, and/or a parabolic fade envelope. In some examples, the signal sent in step 524 may start at the same signal level as the signal sent in step 520 (i.e., also may start at MaxV). In some examples, the signal sent in step 524 may start at a different level than the signal sent in step 520. In some examples, the pulse-width-modulated signal with a suitable envelope may last for substantially the entire duration of the fourth predetermined time interval (T4 in FIG. 9). Step 524 may be performed at any suitable time, such as immediately after the fourth predetermined time interval elapses.

During the fourth predetermined time interval and/or after the fourth predetermined time interval elapses, any suitable additional steps may be taken. For example, output signals from the audio input device may be received and acted upon similar to, and/or different from, previous steps. When an additional output signal is received, the winding down of the motor may be interrupted and the motor may be driven based on the received output signal. In other words, the fourth predetermined time interval in which winding down of the motor occurs may end before the maximum duration of fourth predetermined time interval elapses (e.g., 1 second).

At step 526, monitoring for a third output signal may be performed, which may be performed during the fourth predetermined time interval and/or after the fourth predetermined time interval elapses. While monitoring, the third output signal may be received at any time during the fourth predetermined time interval, at the end of the fourth predetermined time interval, or after the fourth predetermined time interval elapses. In some examples, the third output signal must be based on third audio input that exceeds a third predetermined threshold level to be recognized by the controller. In some examples, the third audio input must exceed a third predetermined threshold for the audio input assembly to generate the third output signal. In some examples, the third predetermined threshold level are the same as the first predetermined threshold level and/or the same as the second predetermined threshold level. In some examples, the third predetermined threshold level may be different from the first predetermined threshold level and/or the second predetermined threshold level.

Although the third output signal may be received at any time as described above, monitoring for the third output signal from the audio input device may begin as soon as (or simultaneously as) the controller starts winding down the motor in step 524. In other words, audio inputs received by the audio input device are no longer ignored or disregarded as soon as the winding down of the motor begins. In some examples, step 526 may include placing the audio input assembly in an activated state in which the audio input device receives audio input and generate an output signal based on the received audio input (such as when the received audio input exceeds a predetermined threshold level). In other examples, the controller may be configured to monitor for the third output signal from the audio input device after (or shortly or immediately after) the winding down of the motor at step 524 has started.

In some examples, method 500 may include one or more steps in addition to, or instead of, the steps shown in FIG. 5. For example, one or more LEDs may be illuminated based on, or in response, to any of the output signals (or any combination of output signals) from the audio input device. Additionally, one or more audio outputs may be generated via the audio output device based on, or in response, to any of the output signals (or any combination of output signals) from the audio input device.

Example Features:

This section describes additional aspects and features of audiovisual devices, presented without limitation as a series of paragraphs, some or all of which may be alphanumerically designated for clarity and efficiency. Each of these paragraphs can be combined with one or more other paragraphs, and/or with disclosure from elsewhere in this application in any suitable manner. Some of the paragraphs below expressly refer to and further limit other paragraphs, providing, without limitation, examples of some of the suitable combinations.

A1. A toy, comprising:

a housing having a base portion and at least one movable portion, wherein the at least one movable portion of the housing is configured to move among a plurality of positions relative to the base portion;

a motor contained within the housing and configured to move the at least one movable portion of the housing among the plurality of positions;

an audio input device configured to receive audio input and to generate an output signal based on the received audio input; and a controller configured to:

receive a first output signal generated by the audio input device based on received first audio input that exceeds a predetermined threshold level, ignore the audio input device subsequent to receiving the first output signal during a first predetermined time interval, drive the motor based on the received first output signal during the first predetermined time interval, and after the first predetermined time interval has elapsed, wind down the motor during a second predetermined time interval and monitor, during the second predetermined time interval, for a second output signal generated by the audio input device based on received second audio input that exceeds the predetermined threshold level.

A2. The toy of paragraph A1, wherein the controller is further configured to ignore all output signals from the audio input device during the first predetermined time interval.

A3. The toy of paragraph A1, wherein the audio input device is operable between an activated state in which the audio input device receives audio input and generates an output signal based on the received audio input, and a deactivated state in which the audio input device does not receive audio input or does not generate an output signal based on the received audio input, and wherein the controller is further configured to operate the audio input device in the deactivated state subsequent to receiving the first output signal during the first predetermined time interval, and to operate the audio input device in the activated state while winding down the motor during the second predetermined time interval.

A4. The toy of paragraph A3, wherein the controller is further configured to operate the audio input device in the deactivated state subsequent to receiving the second output signal during a third predetermined time interval.

A5. The toy of any of paragraphs A1-A4, wherein, when the second output signal is received from the audio input device during the second predetermined time interval, the controller is further configured to:
 interrupt the winding down of the motor;
 ignore the audio input device subsequent to receiving the second output signal during a third predetermined time interval; and
 drive the motor based on the second output signal during the third predetermined time interval.

A6. The toy of paragraph A5, wherein duration of the third predetermined time interval is the same as duration of the first predetermined time interval.

A7. The toy of any of paragraphs A5-A6, wherein the motor is a reversible motor and the controller is further configured to rotate the motor in a first direction based on the received first output signal during the first predetermined time interval.

A8. The toy of paragraph A7, wherein the controller is further configured to rotate the motor in the first direction during winding down of the motor.

A9. The toy of paragraph A8, wherein, when the second output signal is received from the audio input device, the controller is further configured to rotate the motor in a second direction different from the first direction based on the received second output signal during the third predetermined time interval.

A10. The toy of paragraph A7, wherein the controller is further configured to rotate the motor in the first direction at a first speed based on the received first output signal during the first predetermined time interval.

A11. The toy of paragraph A10, wherein the first speed is a constant speed.

A12. The toy of paragraph A7, wherein the controller is further configured to rotate the motor in the first direction at a second speed during winding down of the motor.

A13. The toy of paragraph A12, wherein the second speed decreases from an initial speed that is the same as the first speed to a final speed that is less than the first speed during the second predetermined interval.

A14. The toy of paragraph A13, wherein the second speed decreases from an initial speed that is about the same as the first speed to a final speed that is substantially less than the first speed during the second predetermined interval.

A15. The toy of paragraph A13, wherein, when the second output signal is received from the audio input device, the controller is further configured to rotate the motor in a second direction different from the first direction at a third speed based on the received second output signal during the third predetermined time interval A16. The toy of paragraph A15, wherein the third speed is the same as the first speed.

A17. The toy of paragraph A15, wherein the third speed is a constant speed.

A18. The toy of any of paragraphs A5 to A17, wherein, after the third predetermined time interval has elapsed, the controller is further configured to:
 wind down the motor during a fourth predetermined time interval; and
 monitor, during the fourth predetermined time interval, for a third output signal generated by the audio input device based on received third audio input that exceeds the predetermined threshold level.

A19. The toy of paragraph A18, wherein, when the third output signal is received from the audio input device during the fourth predetermined time interval, the controller is further configured to:
 interrupt the winding down of the motor;
 ignore the audio input device subsequent to receiving the third output signal during a fifth predetermined time interval; and
 drive the motor based on the third output signal during the fifth predetermined time interval.

A20. The toy of any of paragraphs A2-A19, wherein the controller is further configured to send a pulse-width-modulated signal with a rectangular envelope to the motor based on the received first output signal during the first predetermined time interval.

A21. The toy of paragraph A20, wherein the controller is further configured to send a pulse-width-modulated signal with a logarithmic fade envelope to the motor after the first predetermined time interval elapses.

A22. The toy of paragraph A21, wherein, when the second output signal is received from the audio input device, the controller is further configured to send a pulse-width-modulated signal with a rectangular envelope to the motor based on the received second output signal during the third predetermined time interval.

A23. The toy of any of paragraphs A2-A22, wherein the controller is further configured to monitor for the second output signal from the audio input device after the second predetermined time interval elapses when the second output signal is not received during the second predetermined time interval.

A24. The toy of any of paragraphs A2-A23, further comprising one or more LEDs, wherein the controller is further configured to illuminate at least one LED of the one or more LEDs in response to at least one of the received first output signal or, when the second output signal is received from the audio input device, the received second output signal.

A25. The toy of any of paragraphs A2-A24, further comprising an audio output device, wherein the controller is further configured to generate one or more audio outputs via the audio output device in response to at least one of the received first output signal or, when the second output signal is received from the audio input device, the received second output signal.

B1. A method of controlling a toy having a controller, an audio input device, and a motor, the method comprising:

receiving, by the controller, a first output signal generated by the audio input device based on first audio input that exceeds a predetermined threshold level;

ignoring, by the controller, the audio input device subsequent to receiving the first output signal during a first predetermined time interval;

driving, by the controller, the motor based on the received first output signal during the first predetermined time interval; and after the first predetermined time interval has elapsed, winding down, by the controller, the motor during a second predetermined time interval and monitoring, by the controller and during the second predetermined time interval, for a second output signal generated by the audio input device based on second audio input that exceeds the predetermined threshold level.

B2. The method of paragraph B1, wherein ignoring the audio input device includes ignoring, by the controller, all output signals from the audio input device subsequent to receiving the first output signal during the first predetermined time interval.

B3. The method of any of paragraphs B1 to B2, further comprising, when the second output signal is received:

interrupting, by the controller, the winding down of the motor;

ignoring, by the controller, the audio input device subsequent to receiving the second output signal during a third predetermined time interval; and driving, by the controller, the motor based on the second output signal during the third predetermined time interval.

B4. The method of paragraph B3, wherein the audio input device is operable between an activated state in which the audio input device receives audio input and generates an output signal based on the received audio input, and a deactivated state in which the audio input device does not receive audio input or does not generate an output signal based on the received audio input, and wherein ignoring the audio input device subsequent to receiving the first output signal includes operating, by the controller, the audio input device in the deactivated state subsequent to receiving the first output signal during the first predetermined time interval.

B5. The method of paragraph B4, further comprising operating, by the controller, the audio input device in the activated state until receiving the first output signal or the second output signal.

B6. The method of paragraph B4, wherein ignoring the audio input device subsequent to receiving the second output signal includes operating, by the controller, the audio input device in the deactivated state subsequent to receiving the second output signal during the third predetermined time interval.

B7. The method of any of paragraphs B3 to B6, wherein duration of the third predetermined time interval is the same as duration of the first predetermined time interval.

B8. The method of any of paragraphs B3 to B6, wherein the motor is a reversible motor wherein driving the motor based on the received first output signal includes rotating, by the controller, the motor in a first direction based on the received first output signal during the first predetermined time interval.

B9. The method of paragraph B8, wherein winding down the motor during a second predetermined time interval includes rotating, by the controller, the motor in the first direction during the second predetermined time interval.

B10. The method of paragraph B9, wherein, when the second output signal is received from the audio input device, driving the motor based on the second output signal includes rotating, by the controller, the motor in a second direction different from the first direction based on the received second output signal during the third predetermined time interval.

B11. The method of paragraph B8, wherein rotating the motor in a first direction based on the received first output signal includes rotating, by the controller, the motor in the first direction at a first speed based on the received first output signal during the first predetermined time interval.

B12. The method of paragraph B11, wherein the first speed is a constant speed.

B13. The method of paragraph B11, wherein rotating the motor in the first direction during the second predetermined time interval includes rotating, by the controller, the motor in the first direction at a second speed during the second predetermined time interval.

B14. The method of paragraph B13, wherein the second speed decreases from an initial speed that is the same as the first speed to a final speed that is less than the first speed during the second predetermined interval.

B15. The method of paragraph B14, wherein the second speed decreases from an initial speed that is about the same as the first speed to a final speed that is substantially less than the first speed.

B16. The method of paragraph B15, wherein, when the second output signal is received from the audio input device, rotating the motor in a second direction different from the first direction includes rotating, by the controller, the motor in the second direction at a third speed based on the received second output signal during the third predetermined time interval.

B17. The toy of paragraph B16, wherein the third speed is the same as the first speed.

B18. The toy of paragraph B16, wherein the third speed is a constant speed.

B19. The method of any of paragraphs B3 to B18, further comprising, when the third predetermined time interval elapses:

winding down, by the controller, the motor during a fourth predetermined time interval; and monitoring, by the controller and during the fourth predetermined time interval, a third output signal generated by the audio input device based on third audio input that exceeds the predetermined threshold level.

B20. The method of paragraph B19, further comprising, when the third output signal is received:

interrupting, by the controller, the winding down of the motor;

ignoring, by the controller, the audio input device subsequent to receiving the third output signal during a fifth predetermined time interval; and driving, by the controller, the motor based on the third output signal during the fifth predetermined time interval.

B21. The method of any of paragraphs B2-B20, wherein driving the motor based on the received first output signal includes sending, by the controller, a pulse-width-modulated signal with a rectangular envelope to the motor based on the received first output signal during the first predetermined time interval.

B22. The method of paragraph B21, wherein winding down the motor during a second predetermined time interval includes sending, by the controller, a pulse-width-modulated signal with a logarithmic fade envelope to the motor after the first predetermined time interval elapses.

B23. The method of paragraph B22, wherein, when the second output signal is received from the audio input device, driving the motor based on the received second output signal includes sending, by the controller, a pulse-width-modulated signal with a rectangular envelope to the motor based on the received second output signal during the third predetermined time interval.

B24. The method of any of paragraphs B2 to B23, further comprising monitoring, by the controller, for the second output signal after the second predetermined time interval elapses when the second output signal is not received during the second predetermined time interval.

B25. The method of any of paragraphs B2 to B24, where the toy further includes one or more LEDS, the method further comprises illuminating, by the controller, at least one LED of the one or more LEDs in response to at least one of the received first output signal or, when the second output signal is received from the audio input device, the received second output signal.

B26. The method of any of paragraphs B2 to B25, where the toy further includes an audio output device, wherein the method further comprises generating, by the controller, one or more audio outputs via the audio output device in response to at least one of the received first output signal or, when the second output signal is received from the audio input device, the received second output signal.

C1. In a toy with a sound input and an output mechanism tied to a reversible motor, a processor that:
  when a first valid sound input is received by the processor via the sound input, the processor:
    ignores the sound input for a predetermined amount of time,
    drives the reversible motor in a first direction/with a first polarity with a pulse width modulated signal with a rectangular envelope;
    after the predetermined amount of time has elapsed,
    drives the reversible motor with a PWM signal with a logarithmic fade envelope, and
    reverts to monitoring the sound input; and upon receiving a subsequent valid sound input,
    ignores the sound input for a predetermined amount of time, and
    drives the reversible motor in a second direction/with a second polarity with a pulse width modulated signal with a rectangular envelope.

Manner of Operation/Use

In a preferred embodiment, a user may operate an audiovisual device according to the aspects of the present disclosure either with or without a virtual assistant and/or a software agent. For example, the user may power on the audiovisual device and then use a verbal command which directs the audiovisual device to execute an action or which directs the virtual assistant to signal the audiovisual device to execute an action. For example, the user may ask the virtual assistant to instruct the audiovisual device to "dance" to a particular song. The virtual assistant might then tell the audiovisual device to dance using words recognizable by the user and/or using a particular sequence of tones. The virtual assistant may then play the song specified by the user. The audiovisual device may move to the song according to method 500 described above.

Another possible embodiment may include the user asking the audiovisual device to perform, or asking the virtual assistant to instruct the audiovisual device to perform, particular action(s) that are part of a stored routine. The virtual assistant may then tell the audiovisual device to perform the user specified routine using words recognizable by the user and/or using a particular sequence of tones. The audiovisual device may use information stored in its memory to perform the specified routine.

In some embodiments, a user may control and/or interface with the audiovisual device in any suitable manner. In some examples, a user may interface with the audiovisual device directly via a keyboard, voice commands, visual commands, input controls, and/or any suitable audio, visual, and/or tactile commands. In some examples, a user may interface with the audiovisual device indirectly via one or more other devices, such as a computer, laptop, tablet, virtual assistant, phone and/or other mobile device, smart watch and/or other wearable technology and/or any suitable device. The one or more other devices may communicate with the audiovisual device in any suitable manner, for example, via audio commands, optical commands, a wired connection such as a USB cable or an ethernet cable, a wireless connection such as the internet, a Bluetooth connection, or a radio connection and/or any other suitable wired and/or wireless communication method.

ADVANTAGES, FEATURES, BENEFITS

The different embodiments of the audiovisual device described herein provide several advantages over known motorized devices. For example, the illustrative embodiments described herein allow for receipt of audio inputs for at least a portion of the time during which the device's motor is running. This allows for an appearance of smoother movement and for a more immediate reaction to incoming audio inputs and/or signals. Additionally, and among other benefits, illustrative embodiments of the audiovisual device described herein allow for the audiovisual device to be controlled via a virtual assistant and/or software agent. No known system or device can perform these functions. However, not all embodiments described herein provide the same advantages or the same degree of advantage.

CONCLUSION

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only, and do not constitute a characterization of any claimed invention. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Invention(s) embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the invention(s) of the present disclosure.

What is claimed is:

1. A toy, comprising:
a housing having a base portion and at least one movable portion, wherein the at least one movable portion is constructed from a flexible material, the at least one movable portion of the housing is configured to move among a plurality of positions relative to the base portion, and the base portion and the at least one movable portion collectively defining an interior of the housing;
a motor contained within the interior of the housing and configured to move the at least one movable portion of the housing among the plurality of positions;
an audio input device configured to receive audio input and to generate an output signal based on the received audio input; and
a controller configured to:
receive a first output signal generated by the audio input device based on a received first audio input that exceeds a predetermined threshold level,
ignore the audio input device subsequent to receiving the first output signal during a first predetermined time interval,
drive the motor at a first speed based on the received first output signal during the first predetermined time interval, and
after the first predetermined time interval has elapsed, wind down the motor during a second predetermined time interval from a second speed that is less than the first speed to a third speed that is less than the first speed and the second speed, and monitor, during the second predetermined time interval, for a second output signal generated by the audio input device based on a received second audio input that exceeds the predetermined threshold level.

2. The toy of claim 1, wherein the controller is further configured to ignore all output signals from the audio input device during the first predetermined time interval.

3. The toy of claim 1, wherein the audio input device is operable between an activated state in which the audio input device receives audio input and generates an output signal based on the received audio input, and a deactivated state in which the audio input device does not receive audio input or does not generate an output signal based on the received audio input, and wherein the controller is further configured to operate the audio input device in the deactivated state subsequent to receiving the first output signal during the first predetermined time interval, and to operate the audio input device in the activated state while winding down the motor during the second predetermined time interval.

4. The toy of claim 3, wherein the controller is further configured to operate the audio input device in the deactivated state subsequent to receiving the second output signal during a third predetermined time interval.

5. The toy of claim 1, wherein, when the second output signal is received from the audio input device during the second predetermined time interval, the controller is further configured to:
interrupt the winding down of the motor;
ignore the audio input device subsequent to receiving the second output signal during a third predetermined time interval; and
drive the motor based on the second output signal during the third predetermined time interval.

6. The toy of claim 5, wherein, after the third predetermined time interval has elapsed, the controller is further configured to:
wind down the motor during a fourth predetermined time interval; and
monitor, during the fourth predetermined time interval, for a third output signal generated by the audio input device based on received third audio input that exceeds the predetermined threshold level.

7. The toy of claim 6, wherein, when the third output signal is received from the audio input device during the fourth predetermined time interval, the controller is further configured to:
interrupt the winding down of the motor;
ignore the audio input device subsequent to receiving the third output signal during a fifth predetermined time interval; and
drive the motor based on the third output signal during the fifth predetermined time interval.

8. The toy of claim 1, wherein the controller is further configured to send a pulse-width-modulated signal with a rectangular envelope to the motor based on the received first output signal during the first predetermined time interval.

9. The toy of claim 8, wherein the controller is further configured to send a pulse-width-modulated signal with a logarithmic fade envelope to the motor after the first predetermined time interval elapses.

10. The toy of claim 9, wherein, when the second output signal is received from the audio input device, the controller is further configured to send a pulse-width-modulated signal with a rectangular envelope to the motor based on the received second output signal during a third predetermined time interval.

11. The toy of claim 1, wherein the controller is further configured to monitor for the second output signal from the audio input device after the second predetermined time interval elapses when the second output signal is not received during the second predetermined time interval.

12. The toy of claim 1, further comprising one or more LEDs, wherein the controller is further configured to illuminate at least one LED of the one or more LEDs in response to at least one of the received first output signal or when the second output signal is received from the audio input device.

13. The toy of claim 1, further comprising an audio output device, wherein the controller is further configured to generate one or more audio outputs via the audio output device in response to at least one of the received first output signal or when the second output signal is received from the audio input device.

14. The toy of claim 1, further comprising:
a holder configured to support the audio input device and audibly shield the audio input device from the motor; and
a motor support assembly configured to audibly shield the motor from the audio input device.

15. A method of controlling a toy having a controller, an audio input device, and a motor, the method comprising:
receiving, by the controller, a first output signal generated by the audio input device based on a first audio input that exceeds a predetermined threshold level;
ignoring, by the controller, the audio input device subsequent to receiving the first output signal during a first predetermined time interval;
driving, by the controller, the motor at a first speed based on the received first output signal during the first predetermined time interval; and after the first predetermined time interval has elapsed, winding down, by the controller, the motor during a second predetermined time interval from a second speed that is less than the first speed to a third speed that is less than the first speed and the second speed, and monitoring, by the controller and during the second predetermined time interval, for a second output signal generated by the audio input device based on a second audio input that exceeds the predetermined threshold level.

16. The method of claim 15, wherein ignoring the audio input device includes ignoring, by the controller, all output signals from the audio input device subsequent to receiving the first output signal during the first predetermined time interval.

17. The method of claim 15, further comprising, when the second output signal is received:
interrupting, by the controller, the winding down of the motor;
ignoring, by the controller, the audio input device subsequent to receiving the second output signal during a third predetermined time interval; and
driving, by the controller, the motor based on the second output signal during the third predetermined time interval.

18. The method of claim 17, further comprising, when the third predetermined time elapses:
winding down, by the controller, the motor during a fourth predetermined time interval; and
receiving, by the controller, a third output signal generated by the audio input device based on a third audio input that exceeds the predetermined threshold level during the fourth predetermined time interval.

19. The method of claim 18, further comprising, when the third output signal is received:
interrupting, by the controller, the winding down of the motor;
ignoring, by the controller, the audio input device subsequent to receiving the third output signal during a fifth predetermined time interval; and
driving, by the controller, the motor based on the third output signal during the fifth predetermined time interval.

20. The method of claim 15, where the toy further includes one or more LEDs and an audio output device, the method further comprises at least one of:
illuminating, by the controller, at least one LED of the one or more LEDs in response to at least one of the received first output signal or when the second output signal is received from the audio input device; or
generating, by the controller, one or more audio outputs via the audio output device in response to at least one of the received first output signal or when the second output signal is received from the audio input device.

* * * * *